(12) United States Patent
Shilling (10) Patent No.: US 8,547,603 B2
(45) Date of Patent: Oct. 1, 2013

(54) TRANSPARENCY IMAGING SYSTEMS AND METHODS

(75) Inventor: Charles Roger Shilling, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3451 days.

(21) Appl. No.: 10/701,001

(22) Filed: Nov. 3, 2003

(65) Prior Publication Data

US 2005/0094224 A1     May 5, 2005

(51) Int. Cl.
    *H04N 1/04* (2006.01)
(52) U.S. Cl.
    USPC ............ 358/474; 358/1.9; 358/487; 358/506; 399/378; 399/379; 399/380; 399/377; 355/75
(58) Field of Classification Search
    USPC .......... 358/497, 487, 506; 348/96; 378/167; 399/107; 359/398
    See application file for complete search history.

(56) References Cited

U.S. PATENT DOCUMENTS

| | | | | |
|---|---|---|---|---|
| 5,250,981 A * | 10/1993 | Greene | ........................... | 355/76 |
| 5,483,325 A | 1/1996 | Bodapati et al. | | |
| 5,592,258 A * | 1/1997 | Hashizume et al. | ........... | 355/41 |
| 5,652,665 A | 7/1997 | Chen et al. | | |
| 5,673,105 A * | 9/1997 | Brook, III | ........................ | 355/75 |
| 5,694,315 A | 12/1997 | Huang et al. | | |
| 5,751,451 A * | 5/1998 | Ogoshi et al. | ................. | 358/527 |
| 5,790,187 A * | 8/1998 | Suzuki | ........................... | 348/96 |
| 5,790,278 A * | 8/1998 | Ehrne et al. | .................... | 358/496 |
| 5,814,809 A * | 9/1998 | Han | ........................... | 250/208.1 |
| 5,838,464 A * | 11/1998 | Fredlund et al. | ............... | 358/498 |
| 6,018,161 A | 1/2000 | Batten et al. | | |
| 6,157,440 A * | 12/2000 | Ikeda | ............................. | 355/75 |
| 6,163,385 A * | 12/2000 | Kajander | ....................... | 358/475 |
| 6,169,611 B1 * | 1/2001 | Brook et al. | ................... | 358/487 |
| 6,177,982 B1 | 1/2001 | Snyder et al. | | |
| 6,185,011 B1 * | 2/2001 | William | ......................... | 358/474 |
| 6,222,644 B1 * | 4/2001 | Chen et al. | ..................... | 358/403 |
| 6,233,059 B1 * | 5/2001 | Kodaira et al. | ................ | 358/1.9 |
| 6,233,065 B1 * | 5/2001 | Lee | ................................ | 358/475 |
| 6,292,596 B1 | 9/2001 | Snyder et al. | | |
| 6,417,937 B1 * | 7/2002 | Batten et al. | ................... | 358/487 |
| 6,463,238 B1 * | 10/2002 | Huang et al. | .................. | 399/221 |
| 6,519,023 B1 | 2/2003 | Chang | | |
| 6,788,439 B2 * | 9/2004 | Lu et al. | ......................... | 358/487 |
| 6,850,344 B2 * | 2/2005 | Chang | ............................ | 358/487 |
| 7,031,028 B2 * | 4/2006 | Liu et al. | ........................ | 358/406 |
| 7,570,399 B2 * | 8/2009 | Abundis et al. | ................ | 358/497 |
| 2002/0039205 A1 * | 4/2002 | Chang | ............................ | 358/487 |
| 2002/0051240 A1 * | 5/2002 | Lu et al. | ........................ | 358/474 |
| 2002/0054375 A1 * | 5/2002 | Yamamoto | .................... | 358/468 |
| 2002/0075517 A1 * | 6/2002 | Haining | ........................ | 358/302 |

(Continued)

OTHER PUBLICATIONS

UK Search Report, pp. 1-3 (Mar. 14, 2005).

*Primary Examiner* — King Poon
*Assistant Examiner* — Ted Barnes (57) ABSTRACT

Transparency imaging systems and methods. One embodiment of the transparency imaging system comprises an imaging surface and a cover mounted adjacent the imaging surface. A media adapter is provided as part of the cover, and a chamber is formed in the media adapter. At least one template is receivable within the chamber formed in the media adapter, the at least one template loading the transparency media in the media adapter adjacent the imaging surface for an imaging operation.

21 Claims, 6 Drawing Sheets

(56) References Cited

U.S. PATENT DOCUMENTS

| | | | |
|---|---|---|---|
| 2002/0131031 A1* | 9/2002 | Tsuchida et al. | 355/72 |
| 2002/0135819 A1* | 9/2002 | Sheng | 358/487 |
| 2003/0008987 A1 | 1/2003 | Schuchardt | |
| 2003/0020970 A1* | 1/2003 | Haas et al. | 358/506 |
| 2003/0025952 A1* | 2/2003 | Po-Hua | 358/506 |
| 2003/0038987 A1* | 2/2003 | Khovaylo et al. | 358/474 |
| 2003/0072039 A1* | 4/2003 | Liu et al. | 358/474 |
| 2003/0231363 A1* | 12/2003 | Dowdy et al. | 358/506 |
| 2004/0080794 A1* | 4/2004 | Geer | 358/498 |
| 2007/0035788 A1* | 2/2007 | Fang | 358/487 |

\* cited by examiner

TRANSPARENCY IMAGING SYSTEMS AND METHODS

FIELD OF THE INVENTION

The invention generally pertains to imaging devices, and more specifically, to transparency imaging systems and methods.

BACKGROUND

Imaging devices, such as scanners, copiers, facsimile machines, and multipurpose machines, are readily commercially available for converting tangible images (e.g., documents, photographs) or images of objects (e.g., the cover of a book) into electronic images. These imaging devices operate by generating light from a light source in the imaging device and reflecting this light off of the surface of the tangible image or object. The reflected light is collected on an array of photosensitive elements (e.g., a charge coupled device (CCD)), which convert the reflected light into electronic signals representing the image.

Imaging devices, such as the type described above, may be provided with external media adaptors that can be attached to the imaging devices and adapt the imaging device for use with different types of media. For example, back lighting (e.g., cathode fluorescent light bulbs) may be provided to back light semi-transparent images, such as overhead transparencies and film negatives. Other types of media adapters may also be provided, for example, having mirrors, lenses and/or other optics for transferring the image to the photosensitive elements.

In order to use the media adapter, the user is typically required to raise the cover of the imaging device to expose the platen. The media adapter can then be mounted so that it is adjacent the surface of the platen. The cover of the imaging device must be held open or otherwise secured in an open position to accommodate the media adapter on the platen.

Alternatively, the cover may be removed entirely. However, the user must then reassemble the cover on the imaging device before it can be used again without the media adapter.

SUMMARY

A transparency imaging system may comprise an imaging surface and a cover mounted adjacent the imaging surface. A media adapter is provided as part of the cover, and a chamber is formed in the media adapter. At least one template is receivable within the chamber formed in the media adapter, the at least one template loading the transparency media in the media adapter adjacent the imaging surface for an imaging operation.

A method of imaging transparency media may comprise: retaining transparency media in a template, loading the template into a media slot formed in a cover of an imaging device regardless of the cover position, and backlighting the transparency media for an imaging operation.

BRIEF DESCRIPTION OF THE DRAWINGS

Illustrative and presently preferred embodiments of the invention are shown in the drawings, in which:

FIG. 4(*a*) is a top plan view of an exemplary template that may be used with the transparency imaging system;

FIG. 4(*b*) is a top plan view of another exemplary template that may be used with the transparency imaging system;

FIG. 4(*c*) is a top plan view of another exemplary template that may be used with the transparency imaging system;

FIGS. 7(*a*)-(*c*) illustrate an embodiment of a method of loading templates into the media adapter.

DETAILED DESCRIPTION

Figure 1:
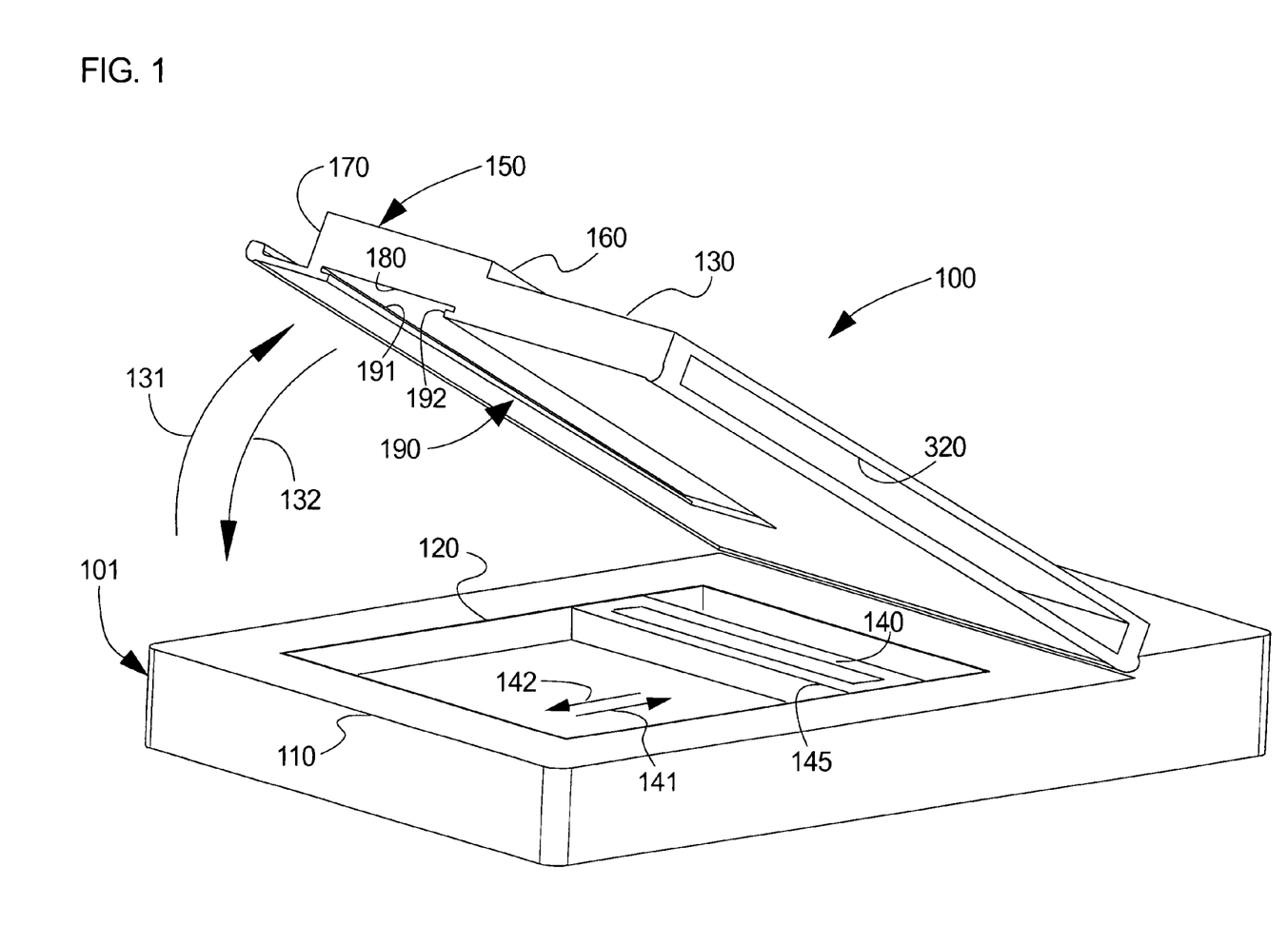
FIG. 1 is a perspective view of an embodiment of a transparency imaging system with a media adapter.
Figure 2:
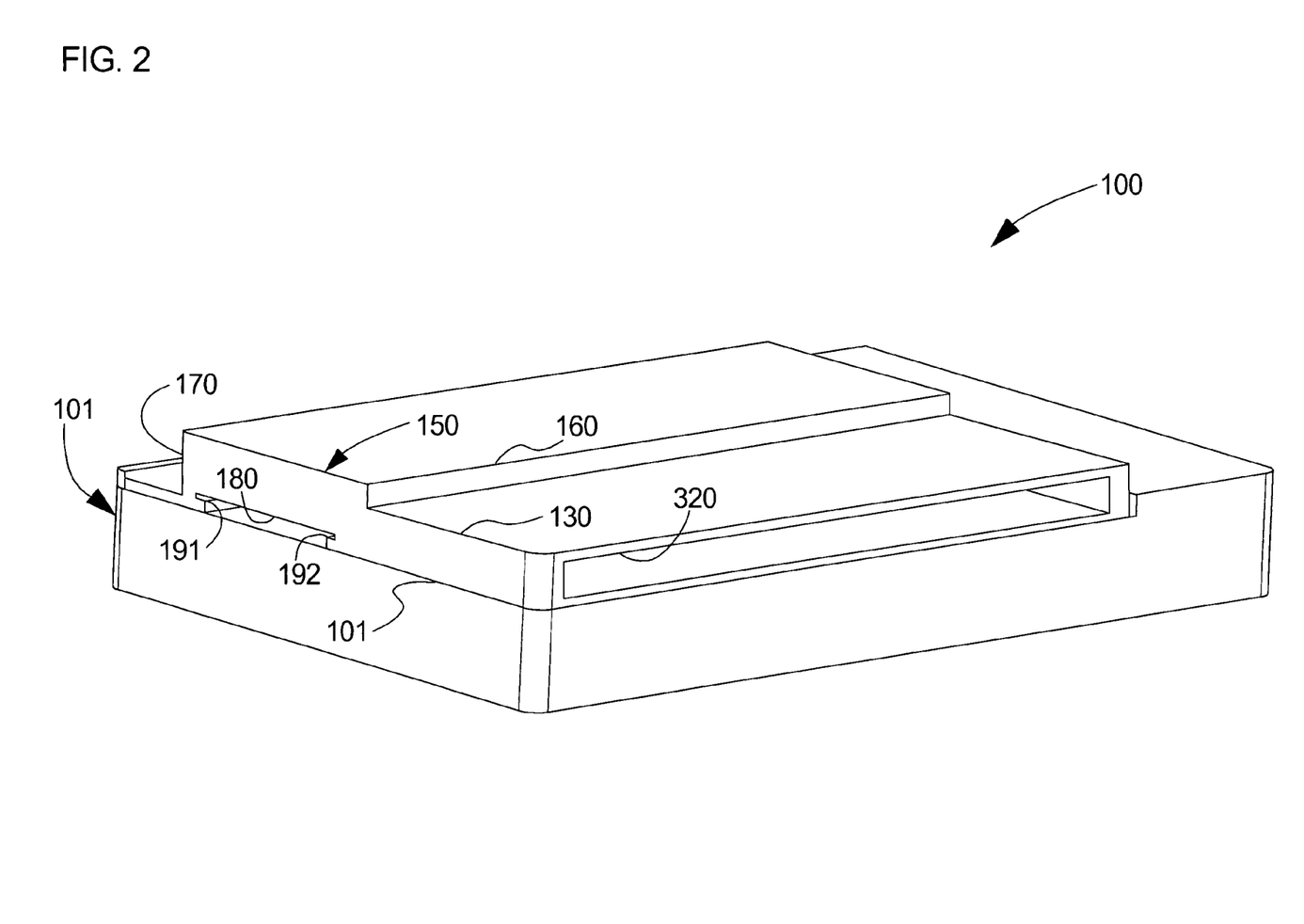
FIG. 2 is another perspective view of the transparency imaging system shown in FIG. 1 with the cover in a closed position.

According to one exemplary embodiment, transparency imaging system 100 may comprise an imaging device 101, such as the flatbed scanner shown in FIG. 1 and FIG. 2. Although the invention will be described herein with reference to a flatbed scanner for purposes of illustration, it is understood that the invention is not limited to use with flat bed scanners. For example, imaging device 101 may comprise handheld scanners, copiers, facsimile machines, multipurpose machines, digital imagine machines, and other electronic devices for capturing digital images.

Imaging device 101 is shown in FIG. 1 and FIG. 2 comprising a housing 110 having an imaging surface 120 (e.g., glass platen). A cover 130 may also be provided to open and close over the imaging surface 120 (e.g., in the directions illustrated by arrows 131 and 132 in FIG. 1). The cover 130 is shown in an open position in FIG. 1 and in a closed position in FIG. 2.

Imaging device 101 may also comprise a light source 140 (FIG. 1) mounted on a carriage 145 within the housing 110 beneath the imaging surface 120. Carriage 145 is operable to move the light source 140 (e.g., in the directions illustrated by arrows 141 and 142) to illuminate object(s) placed adjacent the imaging surface 120.

It will be readily appreciated that imaging device 101, such as the flatbed scanner shown in FIG. 1 and FIG. 2 and described above, may also be provided with various ancillary devices. For example, imaging devices are often equipped with automatic document feeders, paper trays, I/O ports, output trays, LCD displays, and/or keypads to name only a few. These and other ancillary devices are commonly associated with imaging devices, and therefore are not shown or described herein as their description is not needed to fully understand or practice the invention.

The foregoing description of imaging device 101, and the flatbed scanner in particular, is provided as an illustration of one embodiment of an environment in which the invention may be implemented. It should be understood, however, that the present invention may be used in conjunction with any of a wide range of other types and configurations of imaging devices that are now known or that may be developed in the future.

Transparency imaging system 100 may be provided with a media adapter 150 for imaging transparent or semi-transparent media (hereinafter, transparency media), such as overhead transparencies, film negatives, or 35 mm slides, to name only a few. According to one embodiment, media adapter 150 may be provided as part of the cover 130 of imaging device 101 (e.g., as an integral component), as shown in FIG. 1 and FIG. 2. Media adapter 150 is configured to receive the transparency media for the imaging operation, as will be described in more detail below.

Briefly, embodiments of media adapter 150 may include, internally, a light source (e.g., a fluorescent or other white light source, not shown) for backlighting transparency media received in the media adapter 150. Media adapter 150 may also house a diffuser (e.g., frosted glass, not shown) provided between the light source and transparency media. Diffusers for use with media adapters generally function to diffuse light emanating from the light source and distribute the light evenly over transparency media received in the media adapter 150.

Media adapter 150 may also include a window (e.g., an opening, not shown) arranged between the light source and transparency media received in the media adapter 150 so that light is projected onto the transparency media. Optionally, window may be covered with a transparent material (e.g., glass or clear plastic).

In operation, light originating at the light source in media adapter 150 is projected through the diffuser and the window and onto the transparency media to backlight the image thereof. The backlit image is projected onto the imaging surface 120 of the imaging device 101. Light projected from the backlit image passes through the imaging surface 120 and onto photosensitive elements (e.g., provided on the carriage 145). These photosensitive elements are the same as those which already exist on conventional carriages 145 for receiving light reflected off of an opaque object being imaged on the imaging surface 120. An arrangement of optional lenses and mirrors may be provided to focus the light onto the photosensitive elements.

Operation of media adapters in general is understood and therefore further description is not necessary for a full understanding of, or to practice the invention.

According to one embodiment of transparency imaging system 100, the media adapter 150 comprises a housing 160 with a chamber or media slot 180 formed therein. Although media slot 180 is shown formed through front side portion 170 of housing 160, media slot 180 may be formed through any side of the housing 160, and can even be formed through the top side of housing 160 (e.g., so that the media can be "dropped" into the media adapter 150).

Media slot 180 is configured to receive the transparency media (e.g., a 35 mm slide, film negative, overhead transparency) within the media adapter 150 without having to raise the cover 130. In one such embodiment, media slot 180 may comprise a shelf 190 with a lip or guide rails 191, 192. Shelf 190 may be provided to align and guide transparency media into the media slot 180, as will be described in more detail below. In addition, shelf 190 may also retain the transparency media received therein even when the cover 130 is raised (e.g., in the position shown in FIG. 1).

The invention is not limited to the structural arrangement of media slot 180 shown in FIGS. 1 and 2. In another embodiment, an optional translucent cover (not shown) manufactured of glass, clear plastic, or other translucent material, may extend between the guide rails 191, 192 of shelf 190. Alternatively, shelf 190 may comprise a translucent cover instead of guide rails 191, 192. In yet another alternative embodiment, shelf 190 need not be provided at all.

Transparency media may be received in media slot 180 of media adapter 150 in any suitable manner. For example, transparency media may be inserted directly into media slot 180. Transparency media is often very thin, making it difficult to handle and susceptible to damage, for example, by tearing or creasing. Fingerprints can also damage the image on the transparency media. Therefore, according to another embodiment, transparency media is positioned in the media slot 180 using templates, as shown according to one embodiment in FIG. 3.

Figure 3:
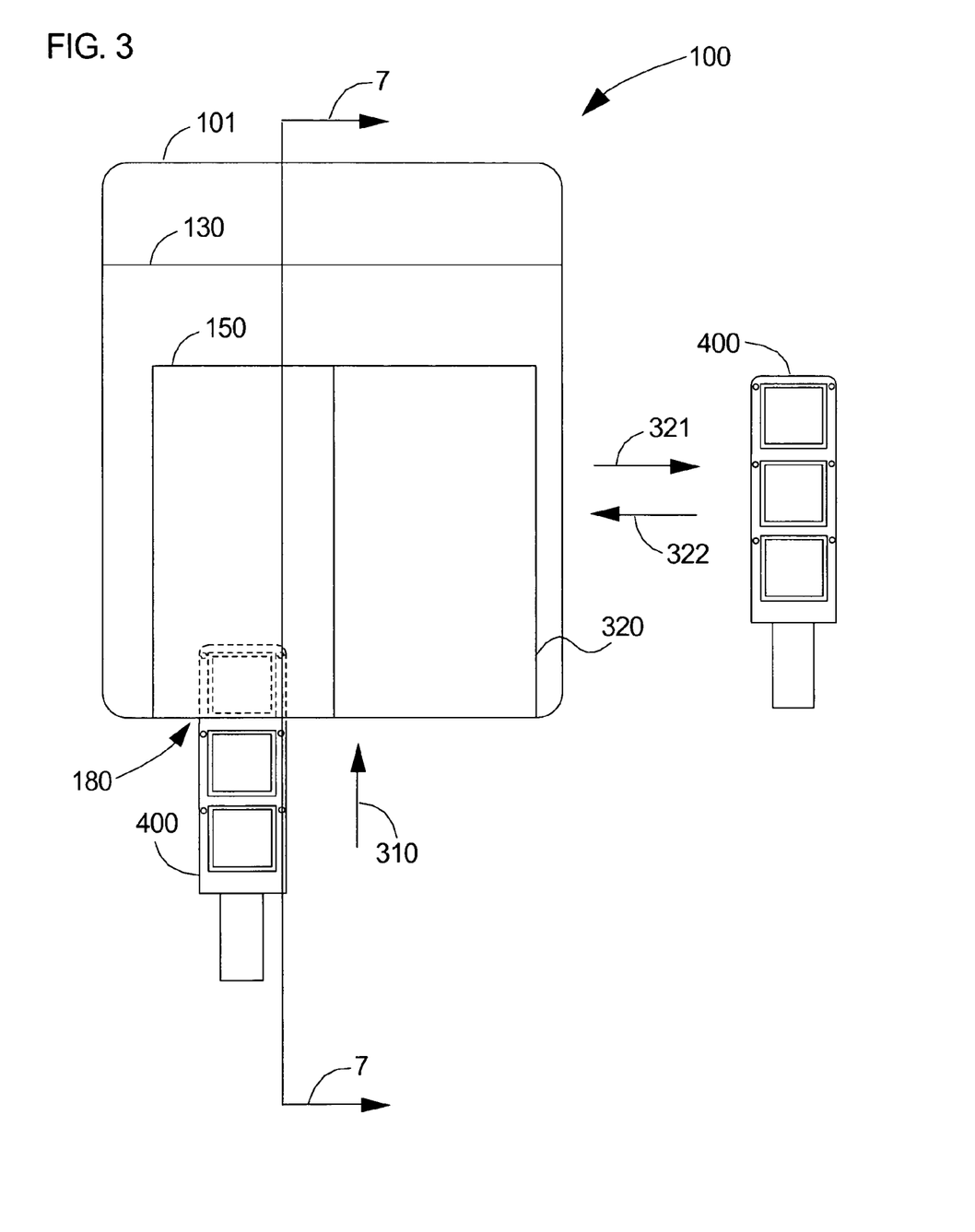
FIG. 3 is a top plan view of the transparency imaging system shown in FIGS. 1 and 2 as it may be used with one or more templates.

According to the embodiment shown in FIG. 3, transparency imaging system 100 may comprise one or more templates (generally referred to as 400). Templates 400 serve to stabilize and firmly guide the transparency media into and out of the media slot 180 of media adapter 150. By way of example, transparency media may be loaded onto template 400 shown in FIG. 3, and then inserted with the template 400 into the media slot 180 of the media adapter 150 as illustrated by arrow 310 in FIG. 3.

Embodiments of transparency imaging system 100 may also include optional storage for the templates 400. In the embodiment of imaging device 101 shown in FIGS. 1 through 3, storage is provided in the cover 130 of the imaging device 101. A storage chamber 320 may be formed in the cover 130 adjacent the media adapter 150. Templates 400 can be inserted and removed from the storage chamber 320, for example, in the directions illustrated by arrows 321, 322 in FIG. 3. Accordingly, templates 400 may be placed in the storage chamber 320 when not in use and readily accessed from the storage chamber 320 for use during an imaging operation.

Figure 4A:
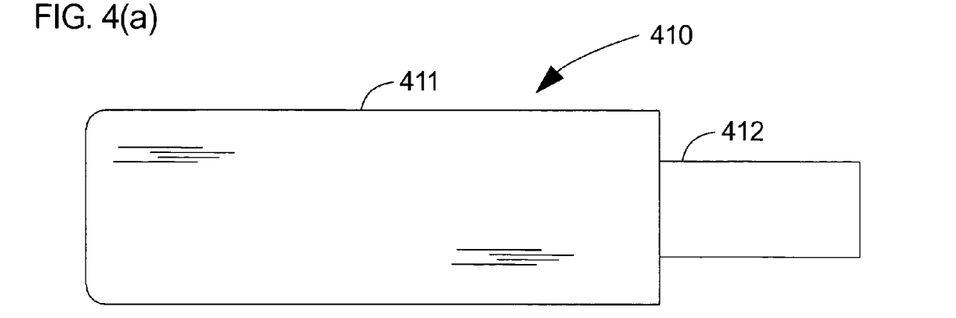
Figure 4B:
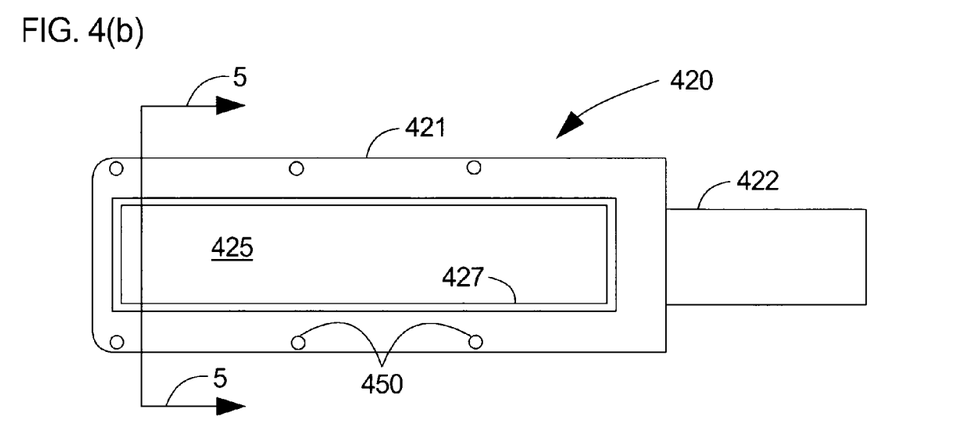
Figure 4C:
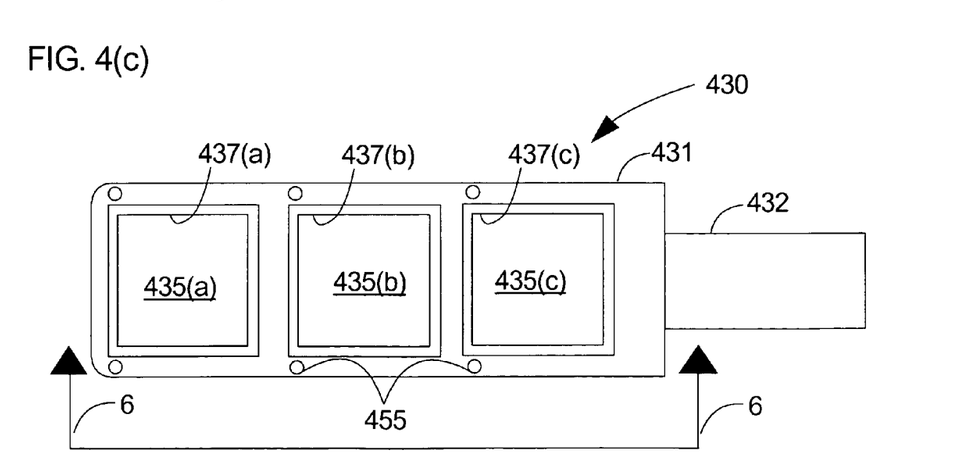

Exemplary templates 410, 420, and 430 that may be used with embodiments of transparency imaging system 100 are shown for purposes of illustration in FIGS. 4(*a*) through (*c*). Templates 410, 420, and 430 may be manufactured of any suitable material, such as an inexpensive, lightweight plastic or other composite material. However, the invention is not limited to use with templates manufactured of any particular material, and it will be appreciated that other materials may also be used.

The first exemplary template is a filler template 410, shown in FIG. 4(*a*). Filler template 410 may comprise an opaque portion 411 and an optional handle 412. Handle 412 allows the user to readily grasp and slide the template 420 into and out of the media slot 180 in media adapter 150 (see FIG. 3). Sliding templates into and out of the media slot 180 is discussed in more detail below when describing methods of operation of the invention, and is similar for each of the exemplary templates 410, 420, and 430.

Filler template 410 is configured to be received in the media slot 180 of media adapter 150 (FIGS. 1-3) so that opaque portion 411 blocks light from the light source in the media adapter 150 when backlighting is not needed. For example, the filler template 410 may be used when the imaging device 101 is operated in a conventional imaging mode to image media or objects on the imaging surface 120 (FIGS. 1-3).

Another exemplary template 420 is shown in FIG. 4(*b*) as it may be used with photo negatives. Template 420 may comprise a retaining portion 421 having an opening or transparency window 425 formed there through. Retaining portion 421 may further comprise ridge or alignment guide 427 formed adjacent one or more sides of the transparency window 425. An optional handle 422 may also be provided to allow the user to readily grasp and slide template 420 into and out of the media slot 180, as previously mentioned.

Figure 5:
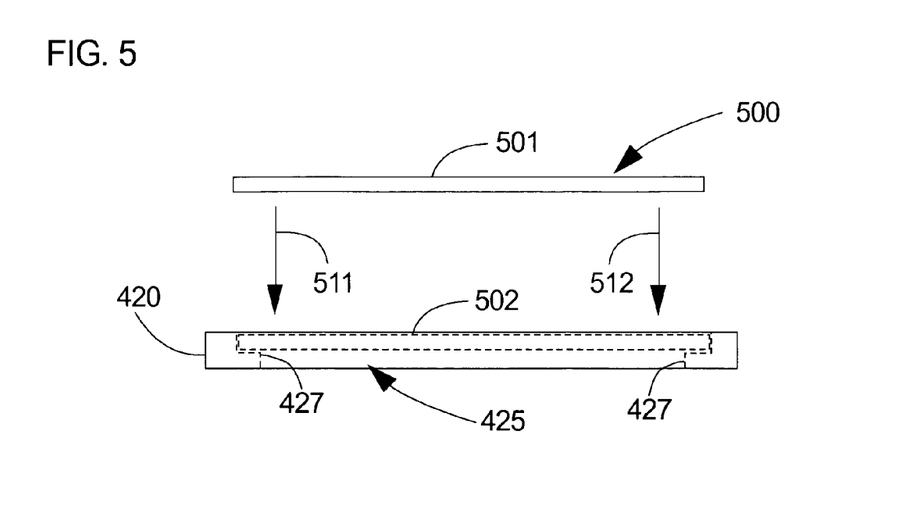
FIG. 5 is a front view of the exemplary template of FIG. 4(*b*) taken along lines 5-5.

Transparency media can be loaded into template 420 as illustrated in more detail in FIG. 5. FIG. 5 is a front view of template 420 taken along lines 5-5 in FIG. 4(*b*). It is readily seen in FIG. 5 that template 420 is configured so that transparency media 500 (e.g., a photo negative) can be positioned at 501 over the transparency window 425 and then inserted into the template 420 in the direction illustrated by arrows 511 and 512. The transparency media 500 is received on ridges or alignment guides 427 in the inserted position 502.

Still another exemplary template 430 is shown in FIG. 4(c) as it may be used for 35 mm slides. Template 430 may also comprise a retaining portion 431 having one or more openings or transparency windows 435(a), 435(b), and 435(c) formed there through. Retaining portion 431 may further comprise ridges or alignment guides 437(a), 437(b), and 437(c) formed adjacent one or more sides of the transparency windows 435(a), 435(b), and 435(c). Transparency media can be loaded into template 430 similarly to that described above for template 420. Again, an optional handle 432 may also be provided to allow the user to readily grasp and slide template 430 into and out of the media slot 180.

Exemplary templates 410, 420, and 430 are shown and described herein merely for purposes of illustration and are not intended to limit the scope of the invention thereto. Other embodiments of templates are also contemplated within the scope of the invention and can be readily provided by one having ordinary skill in the art based upon various design considerations (e.g., the type of transparency media) after having become familiar with the teachings of the present invention. For example, templates can be readily provided for retaining overhead transparencies for use with transparency imaging system 100. In addition, the templates are not limited to any particular size or arrangement for retaining transparency media.

Referring again to FIGS. 4(b) and (c), templates 420 and 430 may also comprise one or more position indicators 450 and 455, respectively. Position indicators 450, 455 may be provided on the retaining portions 421, 431 in any suitable manner to indicate to the user the position of the templates 420, 430 in the media slot 180, as will be discussed in more detail below.

Figure 6:
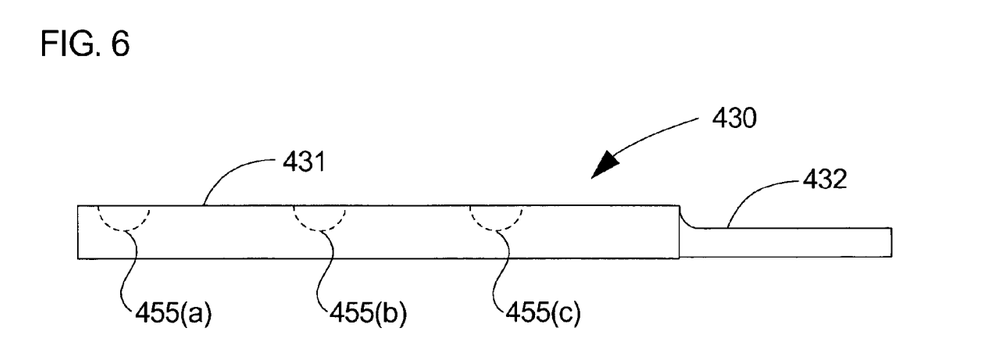
FIG. 6 is a side view of the exemplary template shown in FIG. 4(*c*) taken along lines 6-6.

Position indicators may be better understood with reference to FIG. 6. FIG. 6 is a side view of template 430 taken along lines 6-6 in FIG. 4(c). Although the following description refers to exemplary template 430, it will be appreciated that this description is also applicable to position indicators 450 provided with exemplary template 420.

In the embodiment shown in FIG. 6, position indicators 455(a), 455(b), 455(c) are formed as detents in the retaining portion 431 of exemplary template 430. Position indicators 455(a), 455(b), 455(c) may be used together with mating position indicators (FIG. 7) to provide feedback to the user indicating the position of the template 430 in the media slot 180.

Figure 7:
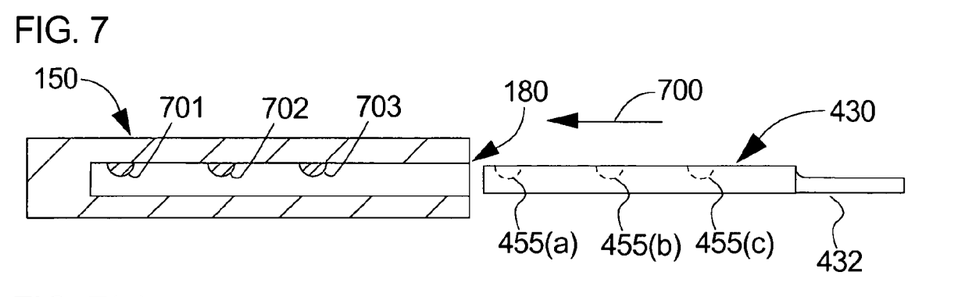
FIG. 7 is a side view of the exemplary template in FIG. 6 shown positioned adjacent a cut-away side view of the media adapter.

FIG. 7 is a cross-sectional view of media adapter 150 taken along lines 7-7 in FIG. 3. It is shown that when the user inserts the template 430 into media slot 180 of the media adapter 150 in the direction illustrated by arrow 700, one or more of the position indicators 455(a), 455(b), 455(c) engage one or more mating position indicators 701, 702, 703, based on the position of the template in media slot 180.

The invention, however, is not limited to any particular embodiment of position indicators 455(a), 455(b), 455(c) (or mating position indicators 701, 702, 703). Other embodiments of position indicators may include for example, but are not limited to, protuberances formed as part of the template, or tabs mounted on the template. Furthermore, the position indicators are not limited to mechanical embodiments, such as those described above. For example, electronic, optical, or opto-electronic position indicators (e.g., radio frequency or infrared circuitry) may also be used according to the teachings of the invention to indicate to the user the position of the template in the media slot. Alternatively, the position indicators may comprise various indicia to indicate position, such as etchings, colorations, or alpha numeric markings.

Having described embodiments of transparency imaging system 100, embodiments of a method for using the transparency imaging system 100 will now be described with reference to FIGS. 7 and 7(a) through (c).

In use, a user may load transparency media (e.g., one or more 35 mm slides) into the template 430, as described above with reference to FIG. 5. The user grasps the handle 432 of template 430 and positions the template 430 adjacent the media slot 180 in the media adapter 150, as shown in FIG. 7. The user then loads the template 430 into the media slot 180 by inserting the template 430 in the direction illustrated by arrow 700.

Figure 7A:
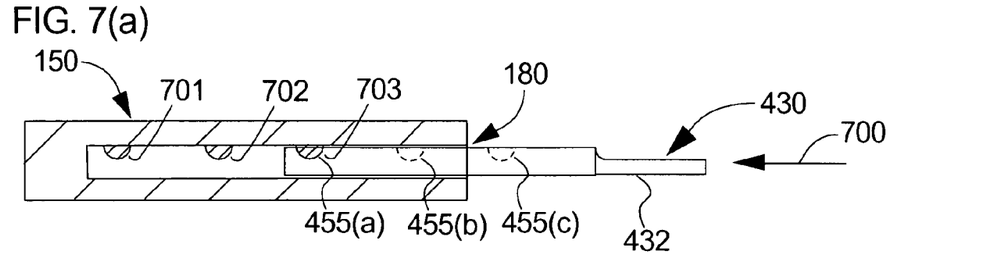

In FIG. 7(a), the user has positioned the template 430 in the media slot 180 so that position indicator 455(a) on the template 430 is engaging mating position indicator 703 in the media slot 180. The user may feel a "snap" or other form of tactile feedback as the position indicator 455(a) engages the mating position indicator 703, thereby providing perceptible feedback to the user of the template's position. The user may initiate an imaging operation using the media adapter 150 and imaging device 101 (FIGS. 1-3) to electronically image the transparency media at the first or forward position in the template 430. For example, if the user loaded multiple 35 mm slides into the template 430, the user may initiate an imaging operation to electronically image the first 35 mm slide in the template 430.

Figure 7B:
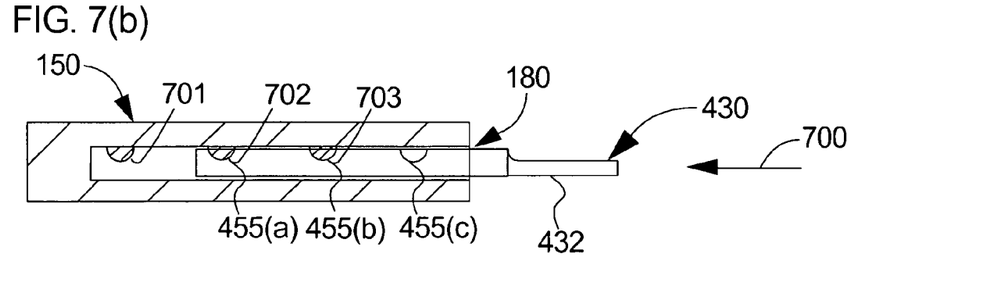

In FIG. 7(b), the user has positioned the template 430 in the media slot 180 so that position indicator 455(a) is engaging mating position indicator 702 and position indicator 455(b) is engaging mating position indicator 703. Again, the user may feel a "snap" as the position indicators engage the respective mating position indicators to provide manual feedback to the user of the template position. The user may now initiate an imaging operation using the media adapter 150 and imaging device 101 (FIGS. 1-3) to electronically image the transparency media at the first and/or second position in the template 430.

Figure 7C:
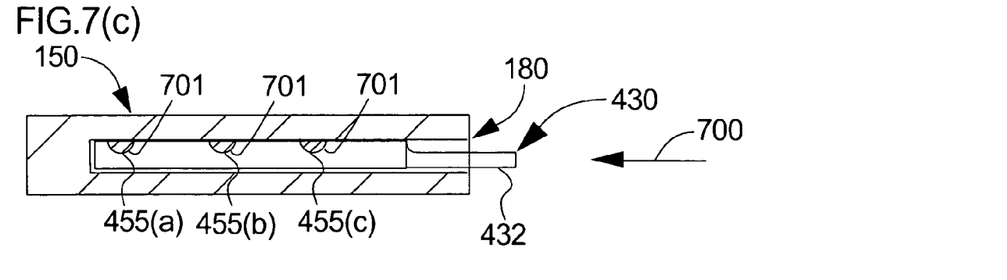

In FIG. 7(c), the user has positioned the template 430 in the media slot 180 so that position indicator 455(a) is engaging mating position indicator 701, position indicator 455(b) is engaging mating position indicator 702, and position indicator 455(c) is engaging mating position indicator 703. Again, the user may feel a "snap" as the position indicators engage the respective mating position indicators to provide manual feedback to the user of the template's position. The user may now initiate an imaging operation using the media adapter 150 of the imaging device 101 to electronically image the transparency media at the first, second, and/or third positions in the template 430.

After the template 430 is loaded into media slot 180 of the media adapter 150 at the desired position (e.g., the positions shown in FIG. 7(a), 7(b), 7(c)), the flatbed scanner 101 can be operated in a transparency imaging mode to make an electronic image of the transparency media. In the transparency imaging mode, light originating at the light source in media adapter 150 is projected onto the transparency media. The light source backlights the transparency media and projects its image onto imaging surface 120 of the flatbed scanner 101 for the imaging operation.

In one embodiment, the imaging device 101 may be configured so that when it is operated in a transparency imaging mode, the image capture function is only performed to selectively capture images projected onto a predetermined area on the imaging surface 120. This embodiment may be implemented in any of a variety of different ways. For example, the carriage 145 may only be moved within a predetermined range beneath the imaging surface 120. Alternatively, the photosensitive elements may only record images when the carriage 145 is within the predetermined range or for a predetermined time during the imaging operation. In yet other embodiments, software may be provided to automatically write image data to an image file which corresponds to a predetermined area on the imaging surface 120. Electronic circuitry, optics, and associated software (or firmware) are also available for automatically detecting the position of an image on imaging surfaces. Other implementations of selectively imaging a predetermined area on the imaging surface, which are now known or may be later developed, are also contemplated as being within the scope of the invention.

In any event, such an embodiment may be used in combination with the method illustrated in FIGS. 7(a)-(c) when the user wants to generate an electronic image file for a selected image. For example, this embodiment may be employed if the user wants to selectively image only one photo image on a photo negative strip having more than one photo image. Alternatively, this embodiment may be used where the user wants to generate separate electronic image files for each of the individual images. For example, this embodiment automatically generates separate electronic image files for each of the individual images so that the user does not need to use software to edit the image file and separate the images into separate image files. This embodiment may also be used to manually select images if the imaging device 101 is not provided with the electronic circuitry, optics, and associated software (or firmware) needed to automatically locate images on the imaging surface 120.

Having herein set forth preferred embodiments of the present invention, it is anticipated that suitable modifications can be made thereto which will nonetheless remain within the scope of the present invention.

What is claimed is:

1. A transparency imaging system, comprising:
   an imaging surface;
   a cover mounted adjacent said imaging surface;
   a media adapter provided as part of said cover;
   a chamber formed in said media adapter; and
   at least one template receivable within the chamber formed in said media adapter, said at least one template positioning transparency media in the chamber formed in said media adapter for use in an imaging operation adjacent said imaging surface;
   wherein a single one of said at least one template is both insertable into and removable from within the chamber formed in said media adapter even when said cover is in either of an open position and a closed position.

2. The transparency imaging system of claim 1, further comprising a filler template, said filler template receivable within the chamber formed in said media adapter to block substantially all light emitted by said media adapter from said imaging surface.

3. The transparency imaging system of claim 1, further comprising a shelf formed as an integral part of said media adapter, said shelf retaining said at least one template in said media adapter over said imaging surface.

4. The transparency imaging system of claim 3, wherein said shelf comprises at least one guide rail, said at least one guide rail aligning said at least one template in said media adapter.

5. The transparency imaging system of claim 3, wherein said shelf retains said at least one template in said media adapter even when said cover is in an open position.

6. The transparency imaging system of claim 1, further comprising at least one position indicator on said at least one template, said at least one position indicator indicating a position of said at least one template in said media adapter.

7. The transparency imaging system of claim 6, wherein said at least one position indicator on said template engages a mating position indicator in said media adapter to indicate the position of said template.

8. The transparency imaging system of claim 6, wherein said at least one position indicator provides tactile feedback to said user to indicate the position of said template.

9. The transparency imaging system of claim 6, wherein said at least one position indicator is selected from electronic indicators, optical indicators, and opto-electronic indicators.

10. The transparency imaging system of claim 1, wherein said template is positionable within the media adapter to selectively image only a portion of the transparency media.

11. The transparency imaging system of claim 1, further comprising a storage chamber formed in said cover, said storage chamber configured to retain said at least one template.

12. A method of imaging transparency media, comprising:
   retaining transparency media in a single template;
   loading the single template into a media adapter having a media slot formed in a one-piece cover of an imaging device regardless of the cover position, wherein the single template is both insertable into and removable from within the media slot formed even when said one-piece cover is in either of an open position and a closed position; and
   backlighting the transparency media by a light source in the one-piece cover for an imaging operation.

13. The method of claim 12, further comprising receiving a filler template in the media slot to block light during an imaging operation.

14. The method of claim 12, further comprising guiding the single template into and out of the media slot when the cover is in either of a closed position and an open position.

15. The method of claim 12, further comprising retaining the single template in the media slot even when the cover is in an open position.

16. The method of claim 12, further comprising indicating a position of the single template in the imaging device.

17. The method of claim 16, further comprising providing tactile feedback to a user to indicate the position of the single template in the imaging device.

18. The method of claim 16, further comprising selectively imaging said transparency media based on the indicated position of the single template in the imaging device.

19. The method of claim 12, further comprising storing the single template in the cover of the imaging device in a storage area separate from the media slot.

20. A transparency imaging system, comprising:
   means for capturing an electronic image;
   means for covering said capturing means, said means for covering movable between an open position and a closed position;
   lighting means positioned in said covering means for backlighting transparency media; and
   means for loading the transparency media in said covering means between said backlighting means and said capturing means, wherein a single one of said means for loading the transparency is both insertable into and removable from within a chamber in said means for covering even when said means for covering is in either of an open position and a closed position.

21. The transparency imaging system of claim 20, further comprising means for indicating a position of the transparency media.

* * * * *

UNITED STATES PATENT AND TRADEMARK OFFICE
CERTIFICATE OF CORRECTION

PATENT NO. : 8,547,603 B2
APPLICATION NO. : 10/701001
DATED : October 1, 2013
INVENTOR(S) : Charles Roger Shilling

Page 1 of 1

It is certified that error appears in the above-identified patent and that said Letters Patent is hereby corrected as shown below:

In the Claims:

In column 8, line 25, in Claim 12, delete "haying" and insert -- having --, therefor.

Signed and Sealed this
Twenty-sixth Day of November, 2013

Margaret A. Focarino
*Commissioner for Patents of the United States Patent and Trademark Office*